C. C. BALDWIN.
STANDING GRAIN HARVESTER.
APPLICATION FILED JULY 20, 1914.
1,290,484.
Patented Jan. 7, 1919.
3 SHEETS—SHEET 1.
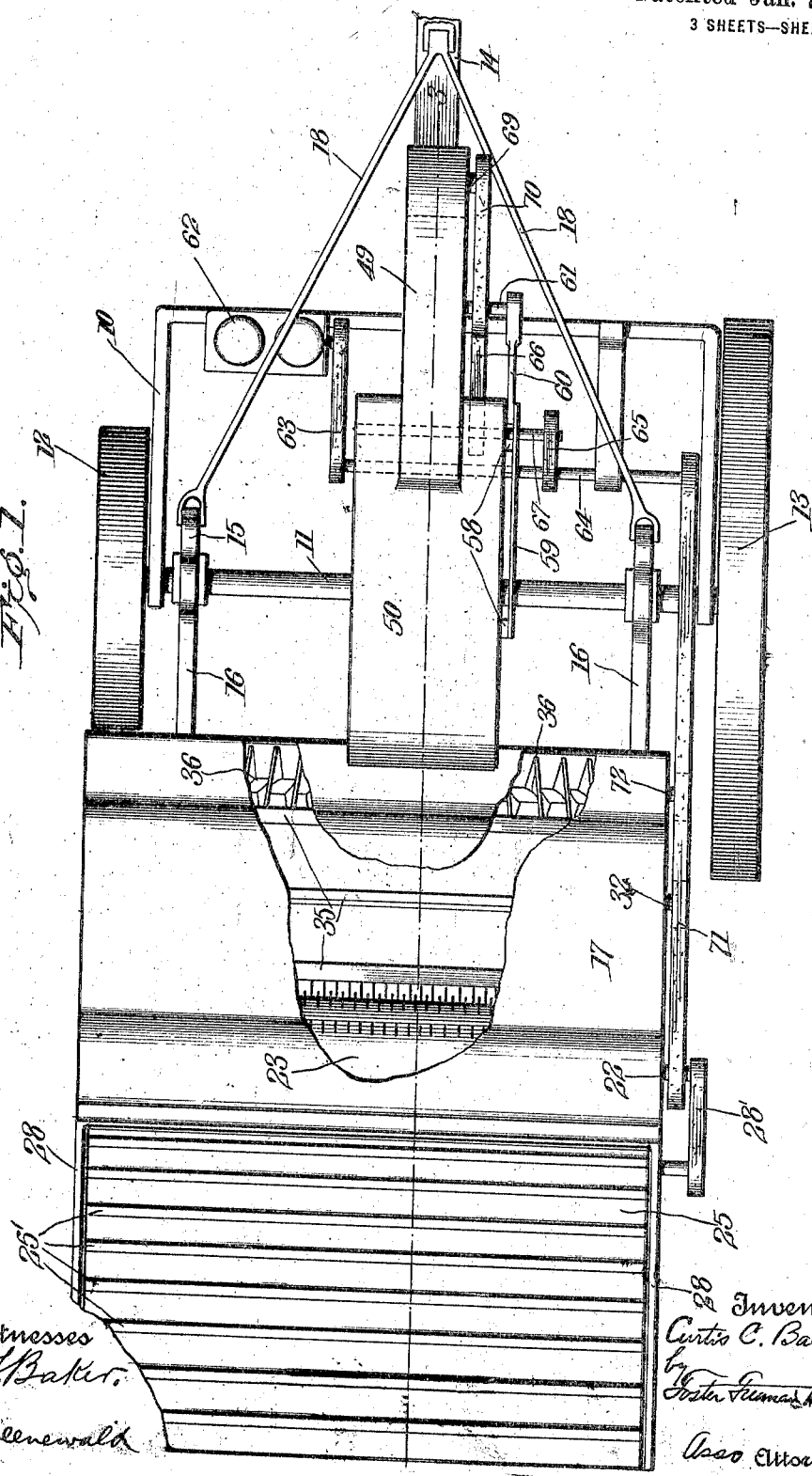

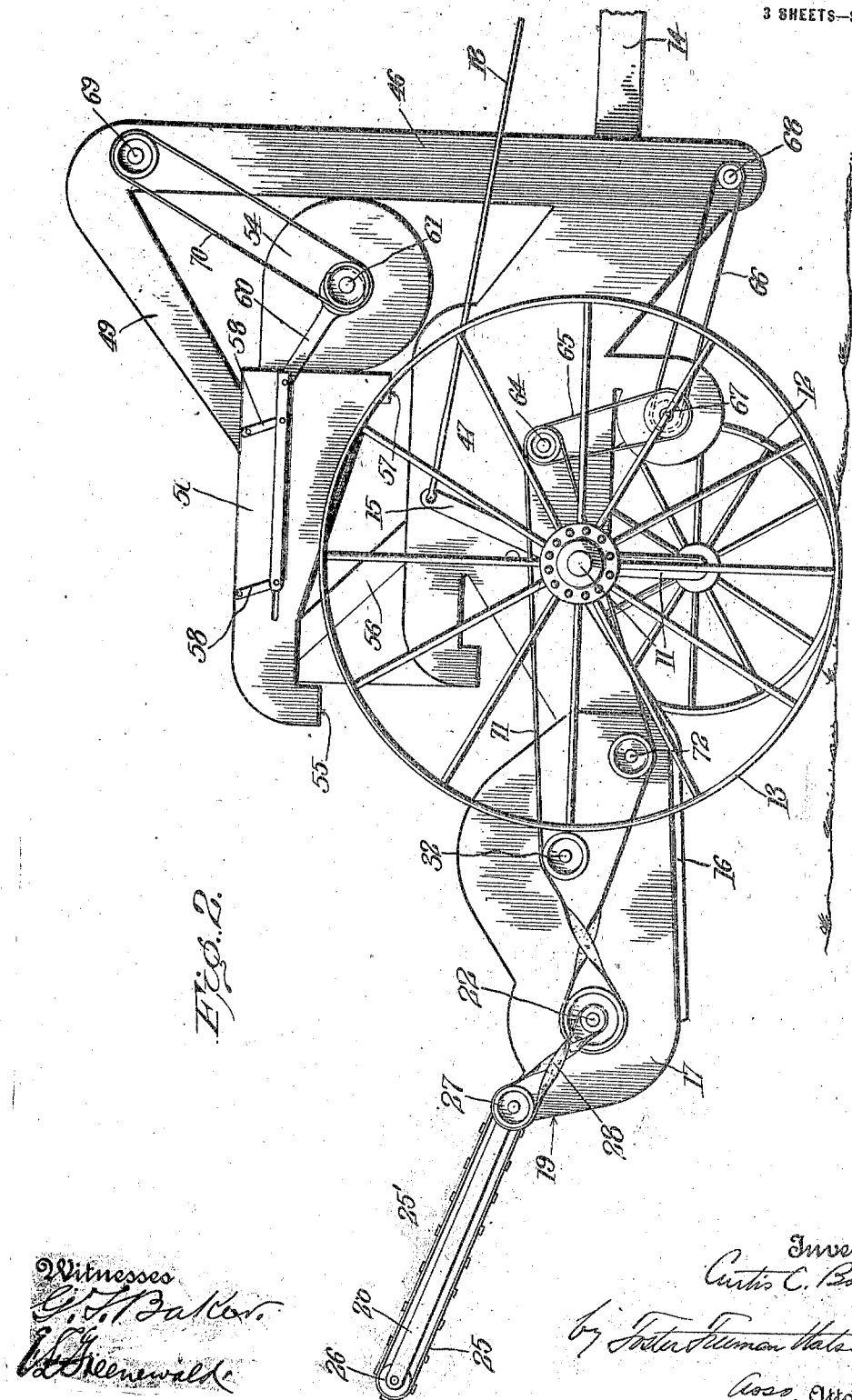

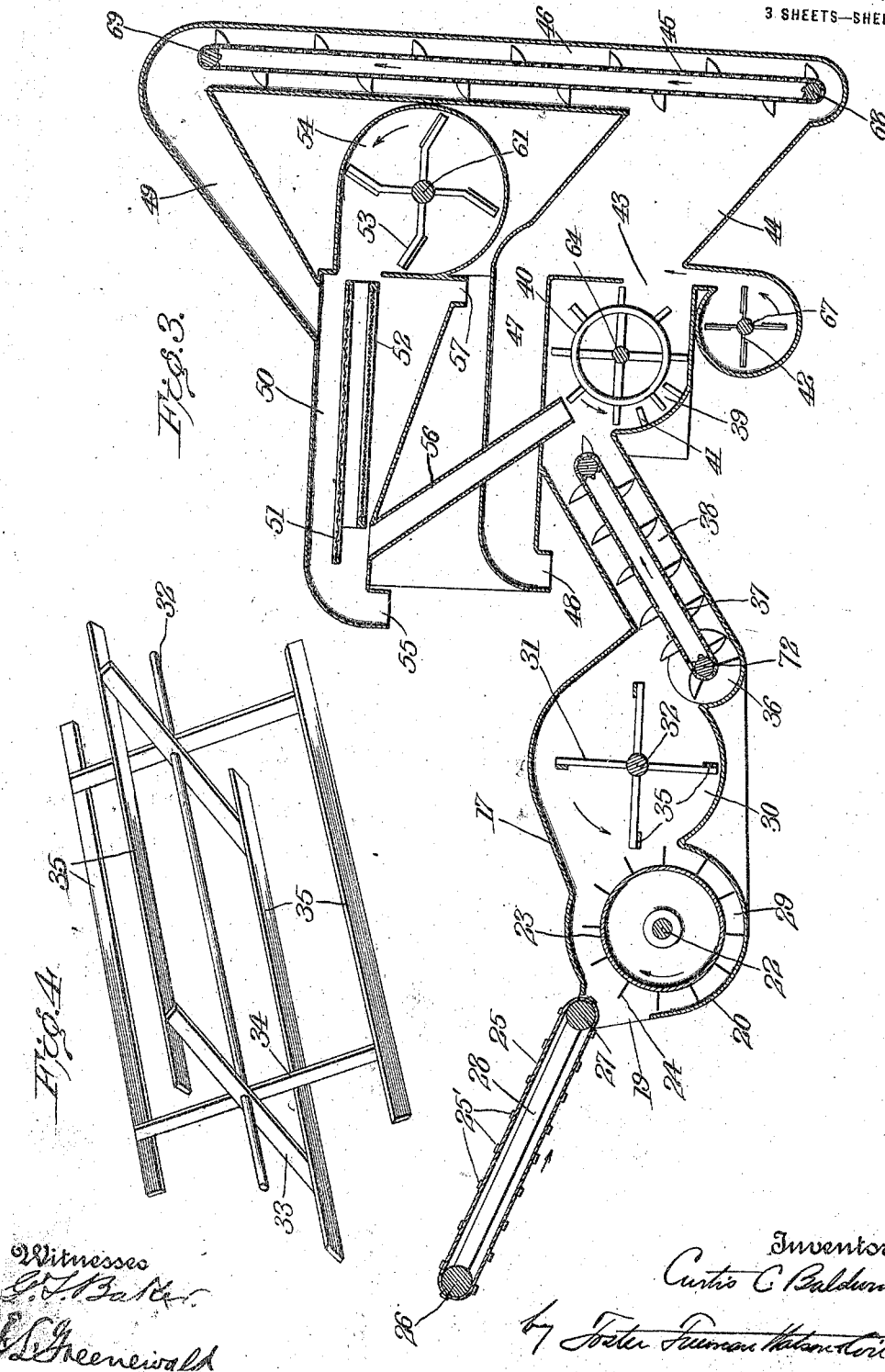

UNITED STATES PATENT OFFICE.

CURTIS C. BALDWIN, OF NICKERSON, KANSAS.

STANDING-GRAIN HARVESTER.

1,290,484.    Specification of Letters Patent.    Patented Jan. 7, 1919.

Application filed July 20, 1914. Serial No. 851,991.

*To all whom it may concern:*

Be it known that I, CURTIS C. BALDWIN, a citizen of the United States of America, and resident of Nickerson, Reno county, State of Kansas, have invented certain new and useful Improvements in Standing-Grain Harvesters, of which the following is a specification.

My invention relates to harvesters and more particularly to a combined standing-grain harvester and thresher, such as is described in Patent No. 1,004,134, granted to me on September 26, 1911.

This invention has for its object to generally improve the construction of the machine shown and described in the above mentioned patent. It has been my object to decrease the weight and power requirement of the machine, and with this end in view I have omitted the blast mechanism for directing and holding the heads of grain against the stripping cylinder and in its stead have placed a draper or endless slatted canvas belt.

A further improvement lies in spacing apart the stripping cylinder and screw conveyer and placing therebetween a rotary sweep to render positive the delivery of the material from said cylinder to the conveyer.

The above and other objects and the novel features of the invention will be apparent from the following description, taken in connection with the drawings, in which:

Figure 1 is a top plan view of a machine embodying my invention, part thereof being broken away;

Fig. 2 is a side elevation of the same;

Fig. 3 is a longitudinal cross-sectional view of the same, taken along the line 3—3 of Fig. 1; and Fig. 4 is a perspective view of the sweep.

Certain parts such as the driving devices in the drawings are merely shown diagrammatically as they constitute no part of the present invention.

The carriage comprises a frame 10 which is pivotally fixed on a main axle 11 at the ends of which are mounted the road wheels 12 and 13. A beam 14 such as in my patent above referred to is secured at one end to the frame 10 and serves as means to which the draft animals may be hitched. Levers 15 are pivoted on the axle 11 and have upwardly projecting ends 16 which extend under the casing 17 in front of the wheels 12 and 13. The levers 15 with the ends 16 thereof form bell crank levers so that by operating levers 18 attached to the arms 15 the casing 17 may be raised and lowered to bring the front end of the device in proper relation to the standing grain.

The casing 17 extends across the front end of the machine parallel to the axle 11 and it has an entrance opening 19 at its front end to receive the upper ends and heads on the stalks of grain. The lower part of the casing 17 has a part 20 which extends around in front of and above the plane of the shaft 22 which carries the stripping cylinder 23. The shaft 22 is mounted in opposite ends of the casing 17 and the stripping cylinder 23 carried thereby has teeth 24 on its outer surface capable of engaging and stripping the heads from the standing grain. In order to positively feed the grain to the stripping cylinder 23 and to hold the heads in contact therewith while the cylinder 23 rotates, I provide a reel draper or endless canvas belt 25 provided at intervals with transverse slats 25'. The belt 25 passes around rollers 26 and 27. The roller 26 is journaled at the outer ends of a pair of arms 28 rigidly secured to the upper forward end of the casing 17 at the top of the opening 19, while the roller 27 is journaled at or near the point where the arms 28 are secured. The draper or endless belt 25 is arranged to have its lower side travel in the direction of the arrow toward the cylinder 23 and above the standing grain, and in contact with the heads thereof and moving preferably at an angle to the plane of the grain. The cylinder 23 is rotated so that its front surface moves upwardly and strips the heads from the grain by an upstroke, the draper forcing the heads against the cylinder and holding them in contact therewith while the cylinder strips them off the stalks. While the slats 25 f the draper do not normally strike the cylinder teeth, they operate to bring the heads in the path of the teeth 24 and bend the straw so as to bring the heads into engagement with the said teeth. It will also be observed that many heads immediately into ont of the cylinder are crowded into contant therewith by other heads which are being pushed back by the draper. The draper is located above and in advance of the cylinder and is driven by a belt 28' from the shaft 22 of the cylinder 23, the adjacent surfaces of the cylinder and belt moving upwardly and in the same direction, thus coöperating to a certain extent to strip the heads from the straw.

From the front compartment 29 in which the stripping cylinder 23 is mounted, the grain and chaff pass into a compartment 30 in which a rotary sweep 31 is journaled. The sweep 31 extends across the machine parallel to the cylinder 23 and is mounted to rotate in bearings in the opposite ends of the casing 17. It consists of a shaft 32 supporting crossed arms 33 and 34 intermediate its ends, carrying bars 35 parallel to the shaft. The sweep is driven in the direction as indicated by the arrow and engages the grain and chaff thrown rearwardly by the stripping cylinder 23 and the bars 35 rotate close to the teeth 24 of the stripping cylinder, so that the delivery of the material from the cylinder 23 to the conveyer 36 will be positive. The conveyer 36 consists of a spiral member journaled in the ends of the casing 17 at the rear thereof and the conveyer extends transversely of the machine the whole length of the casing 17. It is so constructed as to collect and move the material from either end toward the center to an elevator 37 which has buckets or flights thereon to move the grain upwardly through the compartment 38 and into the threshing compartment 39 which contains the toothed threshing cylinder 40, and the toothed concave 41.

The material is threshed in the threshing compartment 39 and a fan 42 discharges a blast of air across the outlet opening 43 of the threshing compartment 39. The grain will be thrown across the opening and into the chute 44 from which it is elevated by the elevator 45, moving vertically in the compartment 46. The chaff will be blown upwardly and out through the conduit 47 and delivery opening 48. The grain is carried upwardly where it is discharged into a chute 49 from which it is delivered into the cleaner shoe 50 in which are located the two riddles or screens 51 and 52. The shoe 50 is supported above the conduit 47 and by suitable frame work on the machine.

A rotary fan 53 in the casing 54 at the rear end of the shoe 50 discharges a blast of air across the riddles and the chaff escapes through the opening 55 at the forward end of the shoe 50. The tailings are returned to the threshing compartment 39 through a conduit 56 while the grain is delivered from a spout 57 at the lower rear end of the shoe 50. Any suitable means may be employed for shaking the screens or riddles 51 and 52. I have shown them mounted on hangers 58 which are pivoted to the shoe 50 and connected together by a bar 59 which is reciprocated by a yoke 60 having an eccentric connection at one end with the shaft 61 on which the fan 53 is mounted.

The mechanism is driven by means of an internal combustion engine or other suitable driving device 62 mounted on the frame 10. A belt 63 connects the shaft of the engine 62 and the shaft 64 upon which the threshing cylinder 40 is mounted. A belt 65 driven by the shaft 64 is connected to drive the fan 42. A belt 66 connects the shaft 67 and the shaft 68 journaled at the lower end of the compartment 46. The belt of the elevator 45 is driven by the shaft 68 and drives the shaft 69 at the upper end of the compartment 46, which is connected by a belt 70 with the shaft 61 upon which are mounted the fan 53 and the eccentric for operating the yoke 60.

The shaft 64 drives a belt 71 which passes around pulleys on the shafts 22, 32 and 72, and is so arranged as to drive these shafts and the elements thereon in the directions indicated by the arrows.

The operation of the device may be most readily traced on Fig. 3. As the machine moves across a field with the draper 25 at the front and at the proper elevation, the said draper whose speed around the rollers is twice the forward speed of the machine drags and pushes the heads of the grain into contact with the teeth and surface of the cylinder 23 which strikes the heads with an upward stroke. The grain heads and chaff are thrown by the cylinder into the chamber 30 of the sweep 31, which sweeps them along the floor to the screw conveyer 36. The conveyer 36 delivers the material to the bucket elevator 37 which delivers the material to the threshing mechanism. From the cylinder 40, the chute 44 delivers the material to the elevator 45 after it has been swept by a blast from the fan 42. From the elevator 45 the spout 49 leads to the cleaner 50 which delivers chaff through the opening 55; tailings through the conduit 56, and clean grain through the spout 57.

While I have shown and described the machine in detail, I do not wish to be limited to the exact construction shown as it is evident that various changes may be made without departing from the spirit of the invention.

Having thus described my invention, what I claim is:—

1. In a harvesting machine of the character referred to, the combination with a wheeled frame and a casing thereon having formed therein an opening adapted to receive the heads of standing grain as the machine is moved forward, of means adapted to positively direct the grain heads into said opening, and a stripping device within the casing moving in the same direction as said head directing means and coöperating therewith to separate the heads from the stalks.

2. In a harvesting machine of the character referred to, the combination with a wheeled frame and a casing thereon having formed therein an opening adapted to receive the heads of standing grain as the machine is moved forward, of an endless belt operating to deflect the heads of grain into said opening as the machine advances, and a movable device within the casing arranged to engage the grain-heads while moving in the same general direction as the operative run of the belt, whereby the heads will be detached from their supporting stalks by a pulling action.

3. In a standing grain thresher, the combination of a casing having an opening at the front thereof, a stripper located in said casing adjacent the opening therein, and means in said casing at the rear of the stripper for clearing away the material from adjacent said stripper, the adjacent parts of said means and stripper moving in substantially the same direction.

4. In a standing grain thresher, the combination of a casing having an opening at the front thereof, a stripper in said casing movable upwardly past said opening and adapted to engage the upper ends of stalks of grain, means for forcing said ends of the grain through said opening and into a position where they will be engaged by said stripper, means for conveying the material along the casing, and means for removing the material from adjacent said stripper and delivering it to said conveying means.

In testimony whereof I affix my signature in presence of two witnesses.

CURTIS C. BALDWIN.

Witnesses:
  ALTA F. GIBBENS,
  LOU A. GIBBENS.